United States Patent
Lindholm et al.

(10) Patent No.: US 10,319,225 B2
(45) Date of Patent: Jun. 11, 2019

(54) SYSTEM, METHOD, AND COMPUTER-READABLE STORAGE MEDIUM FOR DETERMINING ROAD TYPE

(71) Applicant: TOYOTA MOTOR ENGINEERING & MANUFACTURING NORTH AMERICA, INC., Erlanger, KY (US)

(72) Inventors: Trenton B. Lindholm, Canton, MI (US); Vladimeros Vladimerou, Whitmore Lake, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 34 days.

(21) Appl. No.: 15/603,513

(22) Filed: May 24, 2017

(65) Prior Publication Data

US 2018/0342155 A1 Nov. 29, 2018

(51) Int. Cl.
| | |
|---|---|
| *G08G 1/01* | (2006.01) |
| *G08G 1/04* | (2006.01) |
| *G08G 1/054* | (2006.01) |
| *G06K 9/00* | (2006.01) |
| *G01P 3/44* | (2006.01) |

(52) U.S. Cl.
CPC .............. *G08G 1/0137* (2013.01); *G01P 3/44* (2013.01); *G06K 9/00805* (2013.01); *G06K 9/00818* (2013.01); *G08G 1/0108* (2013.01); *G08G 1/04* (2013.01); *G08G 1/054* (2013.01)

(58) Field of Classification Search
CPC ...... G08G 1/0137; G08G 1/0108; G08G 1/04; G08G 1/054; B62D 15/021; G01P 3/44; G06K 9/00805; G06K 9/00818
See application file for complete search history.

(56) References Cited

U.S. PATENT DOCUMENTS

| | | | |
|---|---|---|---|
| 7,427,929 B2 | 9/2008 | Bauer et al. | |
| 7,522,091 B2 | 4/2009 | Cong et al. | |
| 8,452,771 B2 | 5/2013 | Kurciska et al. | |
| 2001/0044678 A1* | 11/2001 | Ito | G01C 21/26 701/1 |
| 2009/0299598 A1* | 12/2009 | Boecker | B60W 30/16 701/96 |
| 2010/0211270 A1* | 8/2010 | Chin | B60W 40/09 701/44 |
| 2011/0004397 A1* | 1/2011 | Nagase | G08G 1/01 701/119 |

(Continued)

*Primary Examiner* — Calvin Cheung
(74) *Attorney, Agent, or Firm* — Oblon, McClelland, Maier & Neustadt, L.L.P.

(57) ABSTRACT

A system for determining a road type includes processing circuitry configured to receive information from a plurality of sensors. The information corresponds to one or more of operation of a host vehicle and an environment surrounding the host vehicle. Additionally, the system determines whether one or more of the plurality of sensors detects an off highway event, classifies the road type as a local road in response to one or more of the plurality of sensors detecting an off highway event, determines whether the speed of the host vehicle is greater than a first predetermined speed for a first predetermined amount of time, and classifies the road type as a limited access highway in response to the speed of the host vehicle being greater than the first predetermined speed for the first predetermined amount of time.

20 Claims, 7 Drawing Sheets

(56) References Cited

U.S. PATENT DOCUMENTS

| | | | |
|---|---|---|---|
| 2011/0246051 A1* | 10/2011 | Vang | G08G 1/0962 |
| | | | 701/117 |
| 2011/0246052 A1* | 10/2011 | Zaitsu | G08G 1/096716 |
| | | | 701/118 |
| 2014/0002652 A1 | 1/2014 | Gonzales et al. | |
| 2014/0355879 A1* | 12/2014 | Agosta | G06K 9/00791 |
| | | | 382/170 |
| 2015/0241878 A1 | 8/2015 | Crombez et al. | |
| 2016/0307441 A1 | 10/2016 | Wieskamp et al. | |
| 2017/0098167 A1* | 4/2017 | Hayashida | G01C 21/3492 |
| 2017/0294129 A1* | 10/2017 | Kasame | G08G 1/167 |

\* cited by examiner

SYSTEM, METHOD, AND COMPUTER-READABLE STORAGE MEDIUM FOR DETERMINING ROAD TYPE

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Vehicles with full or partial autonomous capability include various sensors that gather a significant amount of information about the vehicle and the environment surrounding the vehicle. The information gathered by the sensors can be used to optimize operation of the vehicles in different circumstances that the vehicle may encounter, thereby improving operation and safety.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to embodiments of the disclosed subject matter, a system for determining a road type includes processing circuitry configured to receive information from a plurality of sensors. The information corresponds to one or more of operation of a host vehicle and an environment surrounding the host vehicle. Additionally, the system determines whether one or more of the plurality of sensors detects an off highway event, classifies the road type as a local road in response to one or more of the plurality of sensors detecting an off highway event, determines whether the speed of the host vehicle is greater than a first predetermined speed for a first predetermined amount of time, and classifies the road type as a limited access highway in response to the speed of the host vehicle being greater than the first predetermined speed for the first predetermined amount of time.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
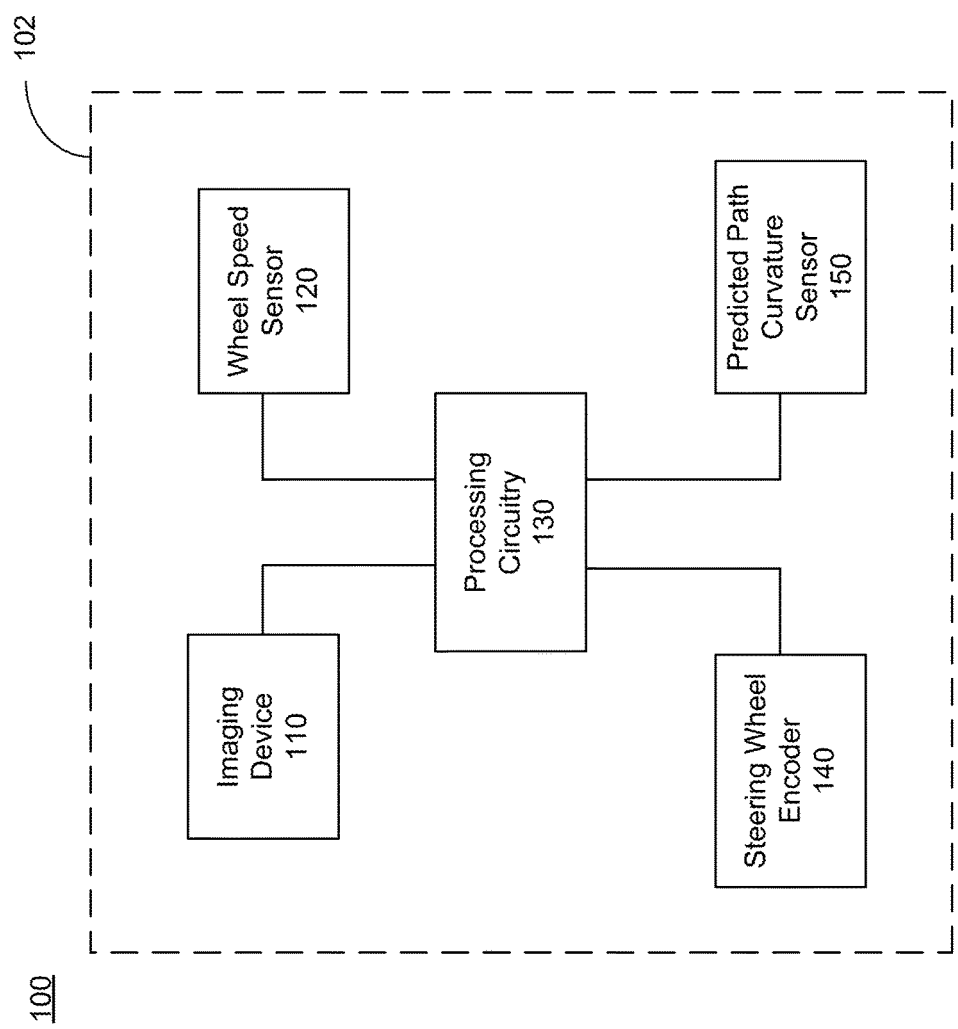
FIG. 1 depicts an exemplary block diagram of a system for determining road type according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "width," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 depicts an exemplary block diagram of a system for determining road type (herein referred to as system 100) according to one or more aspects of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

System 100 can include an imaging device 110, a wheel speed sensor 120, processing circuitry 130 (which can include internal and/or external memory), a steering wheel encoder 140, and a predicted path curvature sensor 150. In an embodiment, the imaging device 110, the wheel speed sensor 120, the processing circuitry 130, the steering wheel encoder 140, and the predicted path curvature sensor 150 can be implemented in a stand-alone apparatus 102. The stand-alone apparatus 102 can be an autonomous vehicle or a highly automated vehicle, for example. Stand-alone apparatus 102 may be referred to as host vehicle 102.

Generally speaking, the system 100 can determine a type of road on which the host vehicle 102 is operating. One or more of the imaging device 110, the wheel speed sensor 120, the steering wheel encoder 140, and the predicted path curvature 150 can detect information about the host vehicle 102 and/or information about the environment that the host vehicle 102 is operating in. Based on the received signals, the processing circuitry 130 can determine a road type. The road type can be a limited access highway or a local road. The limited access highway can be defined as a road way with limited access, no pedestrians, no crosswalks, ramp entry and exit, divided lanes, and the like.

More specifically, based on received signals from one or more of the imaging device 110, the wheel speed sensor 120, the steering wheel encoder 140, and the predicted path curvature sensor 150, the processing circuitry 130 can distinguish between a limited access highway and a local road without additional infrastructure communicating with the system 100 or any map and/or GPS data. In other words, determining the road type on which the host vehicle 102 is travelling can be performed internally to system 100. For example, one or more of the sensors included in the system 100 can detect a non-highway (i.e., non-limited access highway) event. A non-highway event can include crossing a threshold into a predetermined range of steering wheel angles, detecting road curvature in a predetermined range of curvature, speed of the host vehicle 102 being less than a predetermined speed for a predetermined amount of time, detecting one or more objects in the surrounding environment of the host vehicle 102, and the like. For example, the imaging device 110 can detect a stop sign, a pedestrian in a crosswalk, and the like which can correspond to non-highway events and/or observations. In an embodiment, the system 100 can communicate with additional infrastructure and include map and/or GPS information in determining road type.

The imaging device 110 can represent one or more imaging devices including one or more cameras, video cameras, Radar, LIDAR, and the like. The imagine device 110 can detect other vehicles within a predetermined distance of the host vehicle 102, relative speed of preceding vehicles, oncoming vehicles, lateral crossing targets, oncoming traffic in an opposite lane, pedestrians, street signs (e.g., stop, yield, value of speed limit sign, etc.), and the like, for example. For example, if the imaging device 110 detects a pedestrian crossing the road on which the host vehicle 102 is travelling, the system 100 may determine that the road type is a local road rather than a limited access highway.

The wheel speed sensor 120 can represent one or more wheel speed sensors disposed on one or more wheels of the host vehicle 102 to determine a speed at which the host vehicle 102 is travelling. For example, when the wheel speed sensor 120 determines that the host vehicle is traveling above a predetermined speed for a predetermined amount of time, the system 100 may determine that the host vehicle 102 is traveling on a limited access highway.

The steering wheel encoder 140 can represent one or more steering wheel encoders configured to determine an angle at which the steering wheel is positioned. The steering wheel encoder may also track the angle if the steering wheel makes one or more full revolutions (e.g., while performing a U-turn). For example, when the steering wheel encoder 140 determines that the steering wheel has crossed into a predetermined range of angles (e.g., greater than 90 degrees), the system 100 may determine that the host vehicle 102 is traveling on a local road rather than a limited access highway. In an embodiment, the steering wheel may be at zero degrees when the wheels of the host vehicle are in line with the body of the host vehicle (i.e., straight). When the steering wheel is turned to the left, the range of angles corresponding to determining that the host vehicle is on a local road (i.e., off highway event) may be greater than 90 degrees, for example. Similarly, when the steering wheel is turned to the right, the range of angles corresponding to determining that the host vehicle is on a local road (i.e., off highway event) may be greater than 90 degrees, for example, as further described in FIGS. 7A and 7B.

The predicted path curvature sensor 150 can represent one or more predicted path curvature sensors including one or more of one or more gyroscope and/or accelerometer, one or more imaging devices (e.g., imaging device 110), one or more wheel speed sensors to calculate a speed of the host vehicle 102 (e.g., wheel speed sensor 120), and GPS. For example, predicted path curvature may be calculated in a variety of ways. A first calculation may be based on a combination of speed of the host vehicle 102, lateral acceleration, and a yaw rate. In an embodiment, the predicted path curvature may be calculated based on a GPS trajectory. In an embodiment, the predicted path curvature may be calculated based on identifying lane markers via an imaging device (e.g., imaging device 110). As a result, the predicted path curvature sensor 150 can receive information about the types of turns the host vehicle 102 is navigating through. For example, via the predicted path curvature sensor 150, the system 100 may distinguish between a gradual curve on a limited access highway and a turn at an intersection on a local road. In other words, the predicted path curvature sensor may determine how sharp a turn or curve is, thereby predicting a geometry of the road itself. For example, a limited access highway may be built following guidelines that suggest 300 meters as a minimum radius of curvature (e.g., the smaller the radius of curvature, the sharper the turn). As a result, when the host vehicle 102 determines that the predicted path curvature have a radius of curvature less than 300 meters, the system 100 may determine that the host vehicle 102 has experience an off highway event, for example.

The processing circuitry 130 can carry out instructions to perform or cause performance of various functions, operations, steps or processes of the system 100. The processing circuitry 130 can be configured to store information in memory, operate the system 100, and receive and send information in the form of signal(s) from the imaging device 110, the wheel speed sensor 120, the steering wheel encoder 140, and the predicted path curvature sensor 150, and the like.

Figure 2:
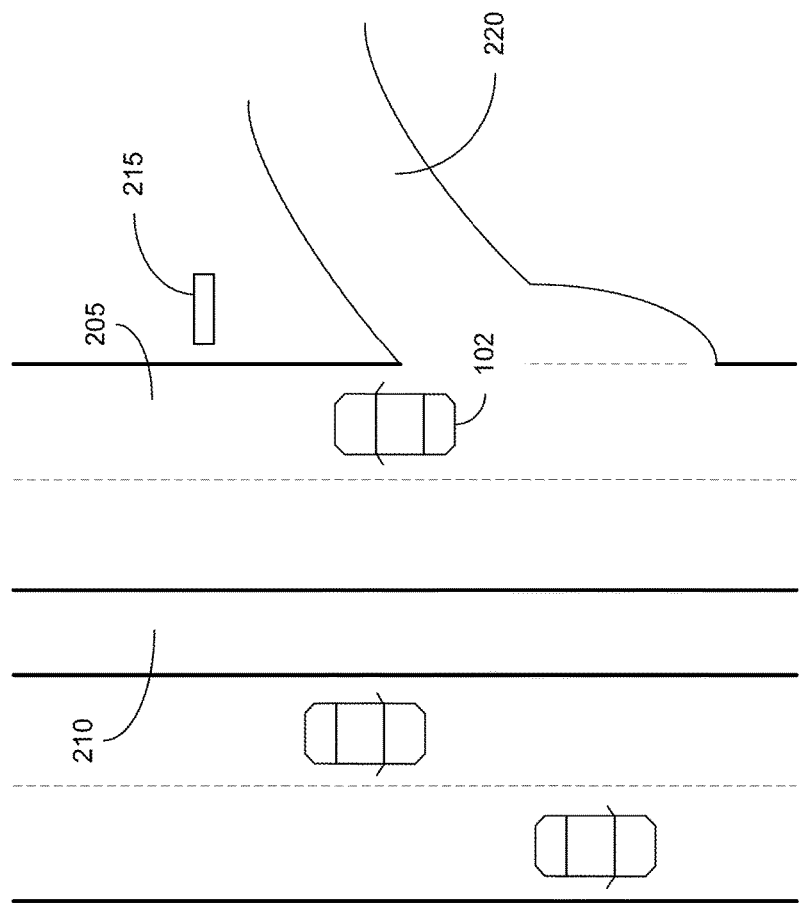
FIG. 2 depicts an exemplary overview of a host vehicle on a limited access highway according to one or more aspects of the disclosed subject matter.

FIG. 2 depicts an exemplary overview of a host vehicle 102 on a limited access highway 205 according to one or more aspects of the disclosed subject matter. The limited access highway 205 can include a divider 210, a street sign 215, a ramp 220, and the like. The divider 110 can be within a predetermined range of widths (e.g., up to 5 km) and/or may be one or more of various types of dividers including concrete dividers, green areas (e.g., grass, wildflowers, trees, shrubs, etc.), and the like. The street sign 215 can represent one or more street signs include speed limit signs, lane ending signs, mile markers, and the like. The ramp 220 can represent one or more entry and/or exit ramps configured for entering and exiting a limited access highway, respectively.

Based on one or more of the speed of the host vehicle 102, the identification of the ramp 220, identification of one or more signs 215, identification of the divider 210, and the like, in addition to the information being received from the plurality of sensors in system 100, the system 100 may determine that the host vehicle is traveling on a limited access highway.

Figure 3:
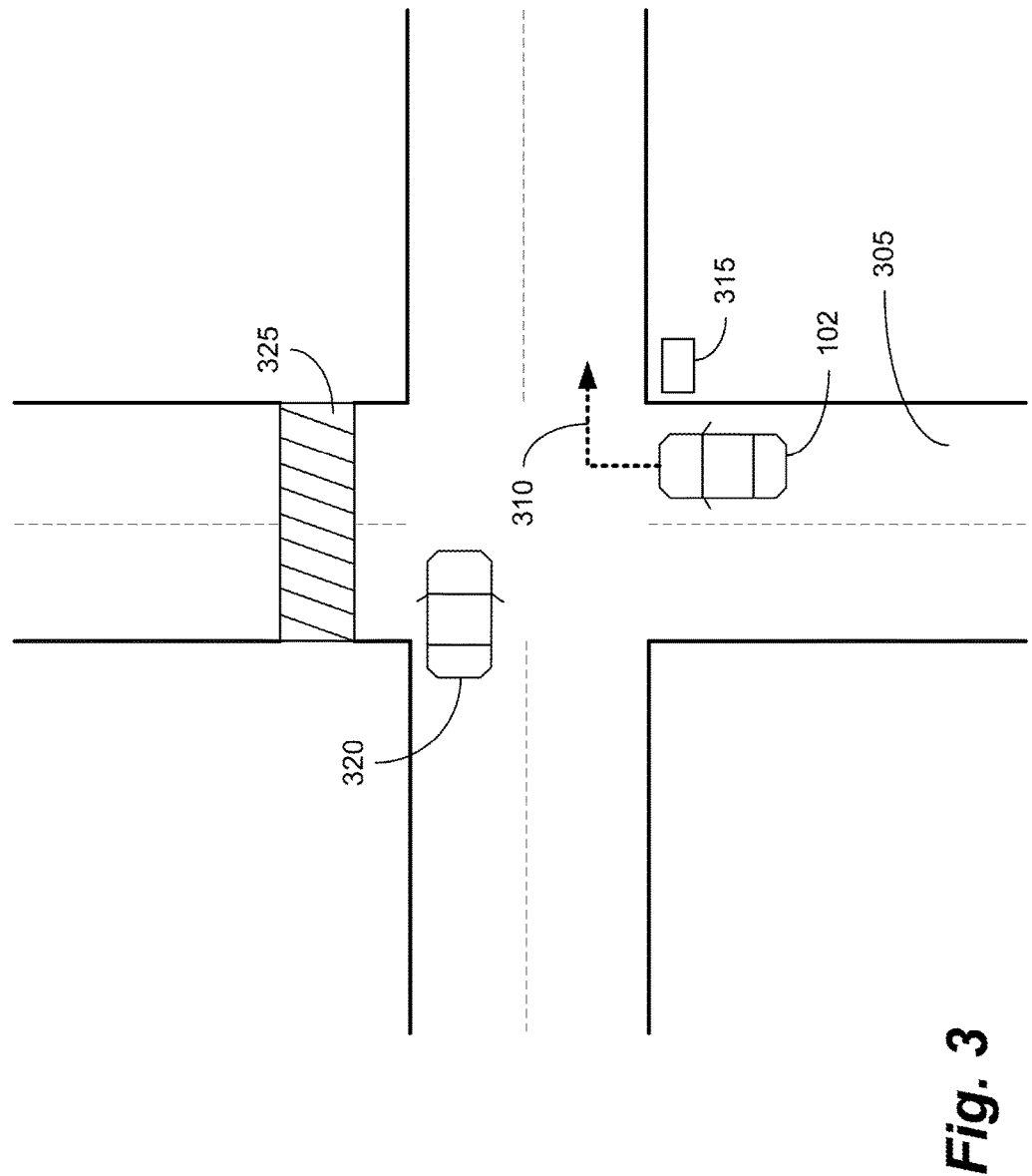
FIG. 3 depicts an exemplary overview of a host vehicle on a local road according to one or more aspects of the disclosed subject matter.

FIG. 3 depicts an exemplary overview of a host vehicle 102 on a local road 305 according to one or more aspects of the disclosed subject matter. The local road 305 can include a street sign 315, a lateral crossing target 320, and a crosswalk 325. The street sign 315 can represent one or more street signs that may be found on local roads including a stop sign, a speed limit sign indicating a speed limit less than a predetermined speed (e.g., less than 45 miles-per-hour), a pedestrian crossing sign, and the like. The lateral crossing target 320 can represent one or more lateral crossing targets including a vehicle, a bicycle, a pedestrian, an animal, and the like. The crosswalk 325 can represent one or more crosswalks as they would appear on local roads. The street sign 315, the lateral crossing target 320, and the crosswalk 325 may be identified by the imaging device 110, for example. Line 310 may represent a turn that the host vehicle 102 may make on a local road. For example, the host vehicle 102 may approach an intersection, identify sign 315 as a stop sign, come to a stop at the intersection, and perform a right turn when the intersection is clear of lateral crossing targets 320. As line 310 indicates, the turn that the host vehicle 102 navigates may be around 90 degrees, which can correspond to a predetermined amount of steering wheel turn to perform the right hand turn. As a result, the steering wheel encoder 140 may detect that the angle of the steering wheel has crossed into a predetermined threshold corresponding to a non-highway event. Therefore, the system 100 may determine that the host vehicle 102 is traveling on a local road rather than a limited access highway. Alternatively, or additionally, the system 100 may determine that the host vehicle 102 is traveling on a local road in response to identifying one or more lateral crossing targets 320, one or more signs 315, and/or one or more crosswalks 325.

Figure 4:
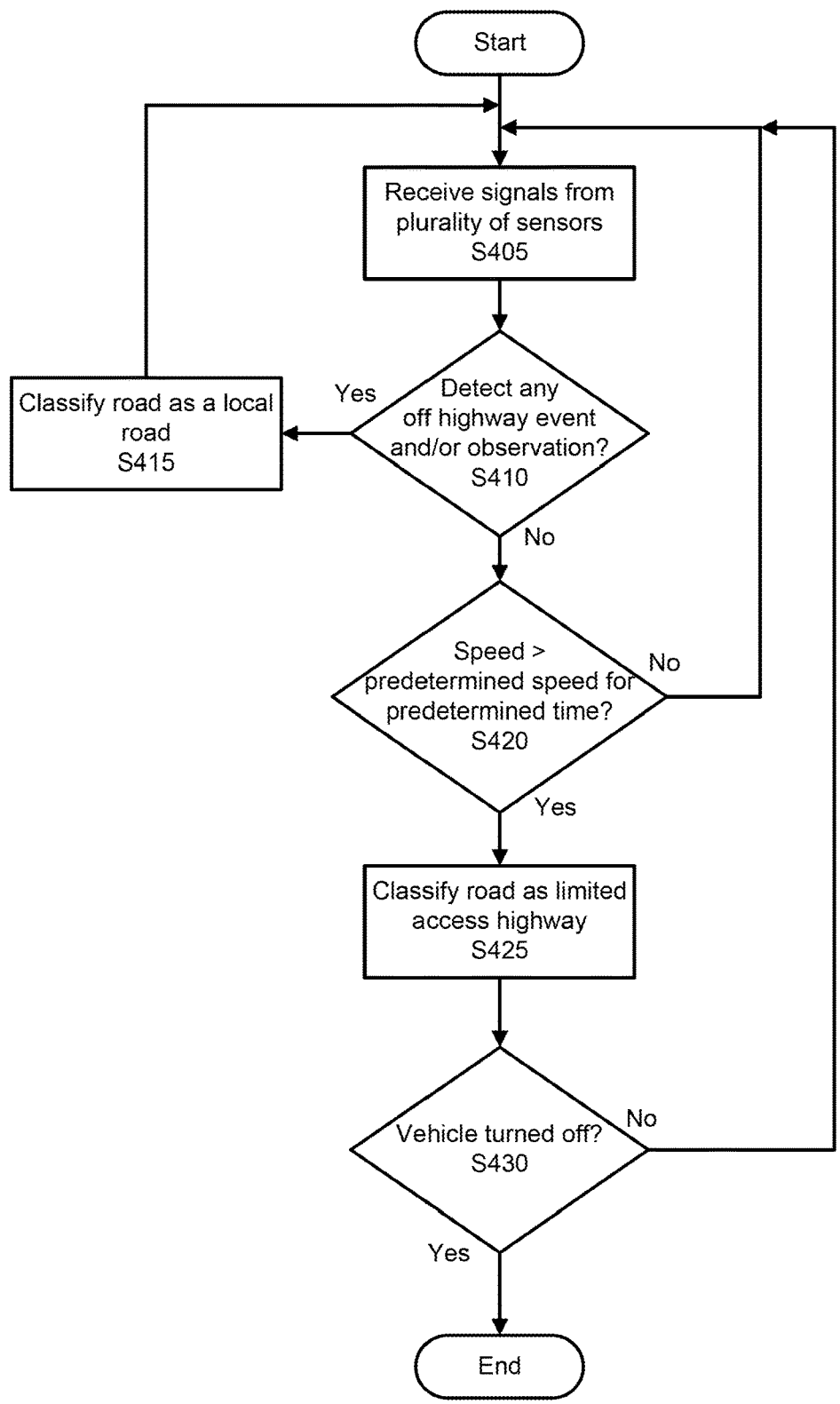
FIG. 4 is an algorithmic flow chart of a method for determining a road type according to one or more aspects of the disclosed subject matter.

FIG. 4 is an algorithmic flow chart of a method for determining a road type according to one or more aspects of the disclosed subject matter.

In S405, signals from one or more of the plurality of sensors from system 100 can be received by the processing circuitry 130. The plurality of sensors can include the imaging device 110, the wheel speed sensor 120, the steering wheel encoder 140, and the predicted path curvature sensor 150.

In S410, it can be determined by the processing circuitry if any off highway event and/or observation is detected based on the signals received in S405. For example, the imaging device 110 can detect a stop sign, for example, which can correspond to an off highway event. Alternatively, or additionally, the wheel speed sensor 120 can determine that the host vehicle 102 is traveling at speeds below highway limit speeds for greater than a predetermined amount of time, for example. Other events that are monitored to determine whether the host vehicle is on a limited access highway can include a steering wheel angle, predicted path curvature, slowing down and waiting at a stop with a preceding vehicle present, slowing down when a preceding vehicle is not present, travelling at speeds above highway speed limits, and traveling at speed below highway speed limits. If it is determined that an off highway event and/or observation is detected, then the road type on which the host vehicle 102 is traveling is determined to be a local road in S415. However, if it is determined that no off highway event and/or observation is detected, then it can be determined if the speed of the host vehicle is greater than a predetermined speed for a predetermined amount of time in S420.

In S415, the road on which the host vehicle 102 is traveling can be classified as a local road (e.g., local road 305) in response to one or more of the sensors of the system 100 detecting an off highway event and/or observation. After the road is classified as a local road, the process can return to S405 to continue receiving information from the plurality of sensors to determine if the road on which the host vehicle 102 is traveling has changed.

In S420, it can be determined if the speed of the host vehicle 102 is greater than a predetermined speed (e.g., 55 miles-per-hour) for a predetermined amount of time (e.g., 120 seconds). The predetermined time threshold may be less for speeds greater than 55 miles-per-hour as further discussed in FIG. 6A. Additionally, before the predetermined amount of time is reached, if the speed of the host vehicle 102 falls below highway speeds (e.g., 55 miles-per-hour) then time can be subtracted from a time achieved by the host vehicle 102 when the host vehicle 102 was traveling at highway speeds as further described in FIG. 6B. If it is determined that the speed of the host vehicle 102 is not greater than the predetermined speed for the predetermined time, the process can return to S405 to continue receiving signals from the plurality of sensors as the host vehicle 102 has not classified the road type as a limited access highway. Therefore, it can be determined that host vehicle remains on a local road. However, if it is determined that the speed at which the host vehicle 102 is traveling is greater than a predetermined speed (e.g., 55 mph) for a predetermined amount of time, than the road on which the host vehicle 102 is traveling can be classified as a limited access highway in S425. Alternatively, or additionally, the system 100 can determine that the host vehicle 102 is traveling on a limited access highway based on one or more of one or more signs 215, one or more ramps 220, and one or more dividers 210 (e.g., median strip).

In S425, the road on which the host vehicle 102 is traveling can be classified as a limited access highway (e.g., limited access highway 205) in response to the speed of the host vehicle 102 being greater than a predetermined speed (e.g., 55 miles-per-hour) for a predetermined amount of time.

In S430, it can be determined if the host vehicle 102 is turned off. If it is determined that the host vehicle 102 is not turned off, then the process can return to S405 to continue receiving signals from the plurality of sensors to determine a road type. However, if it is determined that the host vehicle 102 is turned off, the process can end.

Figure 5:
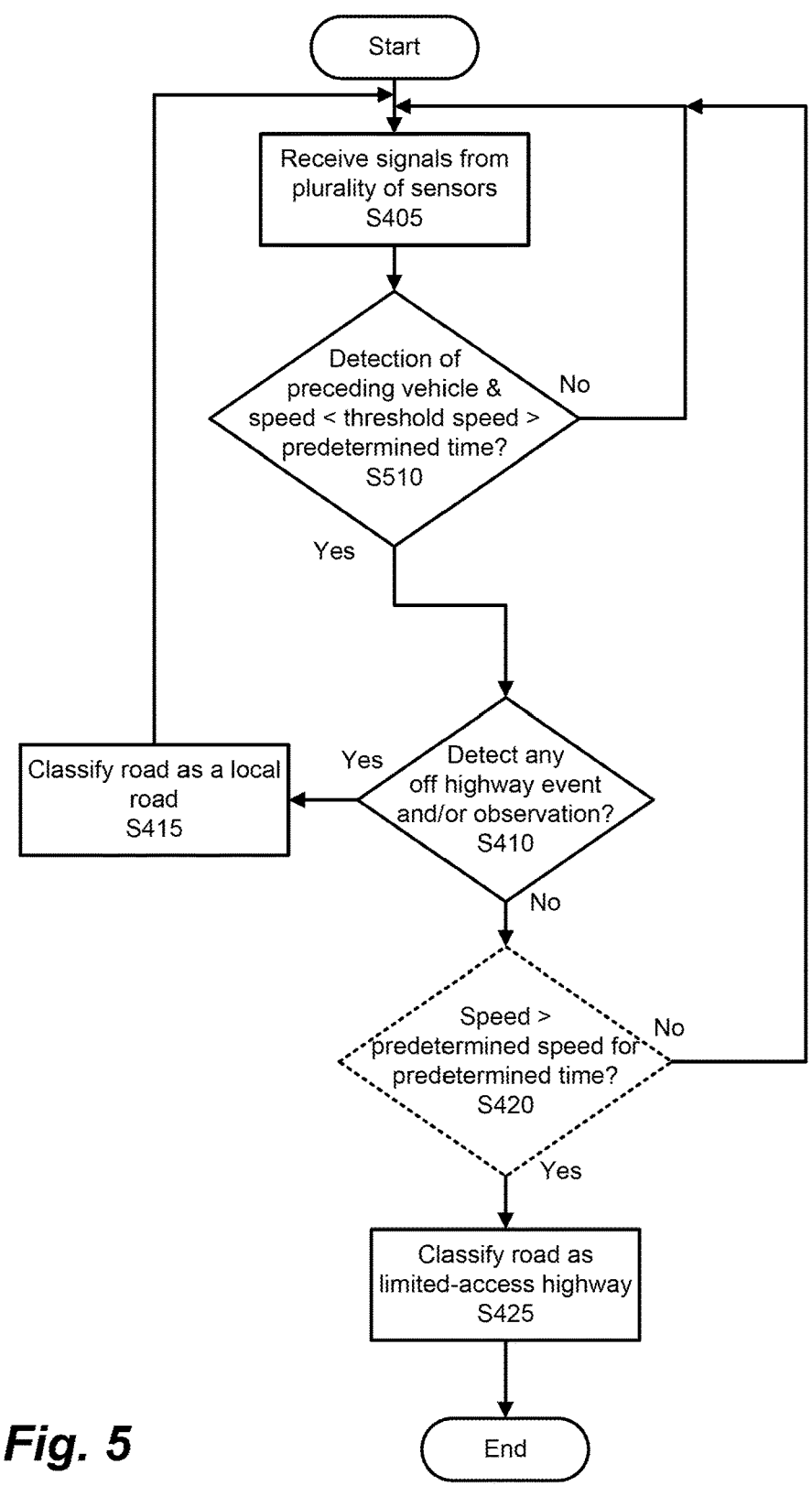
FIG. 5 is an algorithmic flow chart of a method for determining when a host vehicle is no longer on a limited access highway according to one or more aspects of the disclosed subject matter.

FIG. 5 is an algorithmic flow chart of a method for determining when a host vehicle 102 is no longer on a limited access highway according to one or more aspects of the disclosed subject matter. In FIG. 5, steps S405, S410, S415, S420, and S425 can be performed as described in FIG. 4.

Figure 6A:
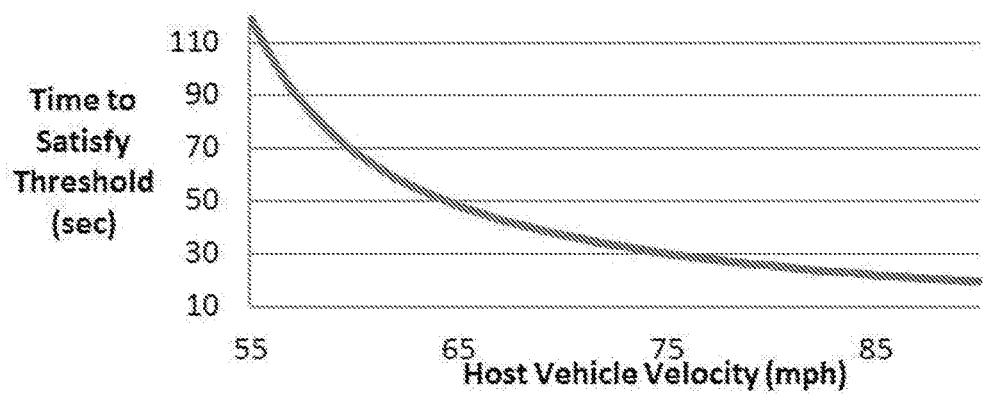
FIG. 6A depicts a graph of host vehicle speed vs. time to satisfy threshold according to one or more aspects of the disclosed subject matter.
Figure 6B:
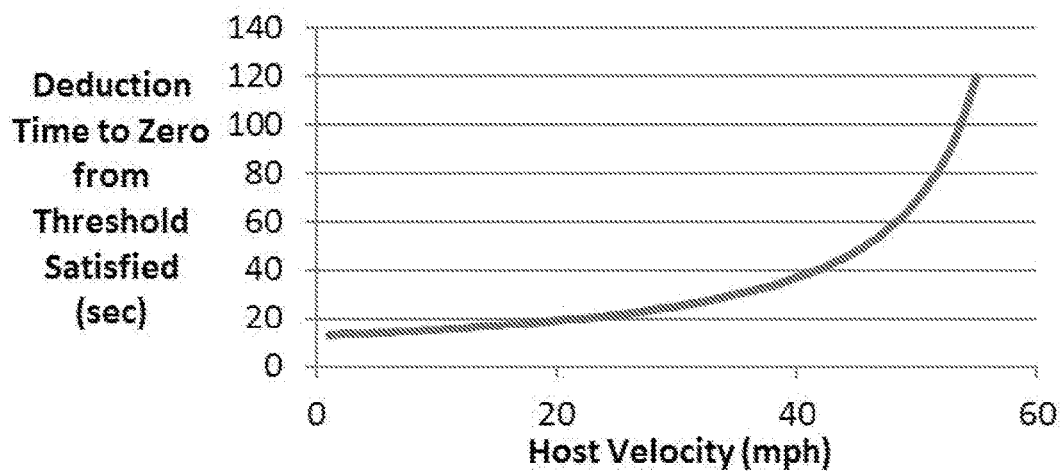
FIG. 6B depicts a graph of host vehicle speed vs. deduction time to zero from threshold satisfied according to one or more aspects of the disclosed subject matter.

In S510, based on received signals from the plurality of sensors in S405 and considering that the host vehicle 102 has been determined to be on a limited access highway, it can be determined if the host vehicle 102 detects a preceding vehicle and if a speed of the host vehicle 102 is less than a threshold speed (e.g., less than highway speeds (e.g., 55 mph)) for greater than a predetermined amount of time (e.g., the predetermined amount of time may be based on FIG. 6B). If it is not determined that the host vehicle 102 detects a preceding vehicle and the speed of the host vehicle 102 is less than a threshold speed for greater than a predetermined amount of time, the process can return to S405 to continue receiving signals from the plurality of sensors. However, if it is determined that the host vehicle 102 detects a preceding vehicle and the speed of the host vehicle 102 is less than a threshold speed for greater than a predetermined amount of time, then the process may continue to S410 where it can be determined if any off highway event and/or observation has been detected. As a result of the detecting the preceding vehicle and dropping below highway speeds for a predetermined amount of time, the host vehicle 102 may still be on the highway, but stuck in traffic, for example. In an embodiment, the host vehicle 102 may temporarily suspend determination of road type and assume that the host vehicle 102 is still on the limited access highway until detection from the plurality of sensors has indicated otherwise. This may help distinguish between a traffic jam on the highway and traveling on a local road, thereby allowing the host vehicle 102 enable specific autonomous vehicle application features corresponding to an autonomous vehicle operating on a highway vs. operating on a local road.

In S420, determining if the speed of the host vehicle 102 is greater than a predetermined speed for a predetermined amount of time may be optional. For example, the host vehicle 102 may be in a traffic jam on a limited access highway. As a result, the imaging device 110 may be able to detect an entry/exit ramp, a divider, and the like indicating that the host vehicle 102 is still on the limited access highway even though the speed of the host vehicle 102 is below highway speed.

One or more of the steps described in FIG. 4 and FIG. 5 can be combined into one or more unique processes. Additionally, one or more of the steps from FIG. 4 and FIG. 5 can be performed simultaneously or in a different order.

FIG. 6A depicts a graph of host vehicle speed vs. time to satisfy threshold according to one or more aspects of the disclosed subject matter. A minimum highway speed may be 55 miles-per-hour (mph), for example. When the host vehicle 102 is traveling at 55 mph (e.g., as determined by the wheel speed sensor 120), the predetermined time required (i.e., threshold) for the determination to be made that the host vehicle 102 may be 120 seconds, for example. However, when the host vehicle 102 is traveling at higher speeds, the threshold may decrease, resulting in the time to satisfy the threshold being around 30 seconds for a host vehicle speed of 75 mph. The time to satisfy the threshold for each speed of the host vehicle 102 greater than or equal to 55 mph may be determined based on the graph in FIG. 6A.

FIG. 6B depicts a graph of host vehicle speed vs. deduction time to zero from threshold satisfied according to one or more aspects of the disclosed subject matter. For example, when the host vehicle 102 is driving on the highway (e.g., entering the highway from an entrance ramp), the host vehicle 102 may be traveling at or above highway speeds, but then may have to slow down due to other cars on the limited access highway. As a result, when the host vehicle 102 drops below highway speeds, a predetermined amount of time may be deducted from the amount of time that the host vehicle 102 was traveling at or above highway speeds. The amount deducted can be determined based on the graph in FIG. 6B.

Figure 7A:
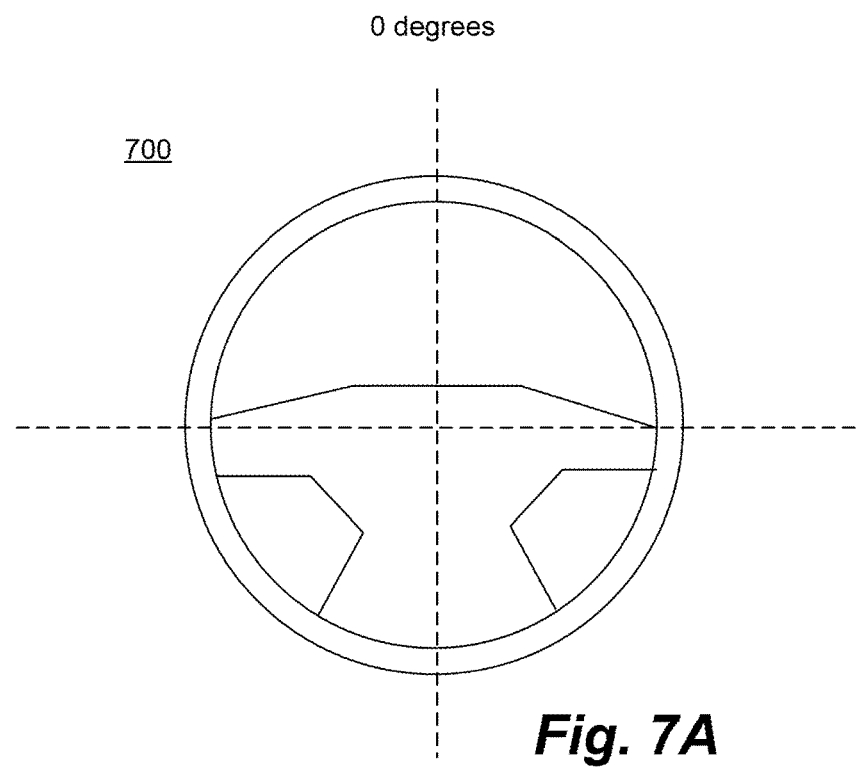
FIG. 7A depicts a steering wheel of the host vehicle according to one or more aspects of the disclosed subject matter.

FIG. 7A depicts a steering wheel 700 of the host vehicle 102 according to one or more aspects of the disclosed subject matter. The steering wheel 700 can be in a default position where 0 degrees can be indicated at a top of the steering wheel when the wheels of the host vehicle are in line with the body of the host vehicle (i.e., straight). In an embodiment, the steering wheel encoder 140 can identify an angle of the steering wheel 700 relative to the zero point as indicated in FIG. 7A when the steering wheel is turned.

Figure 7B:
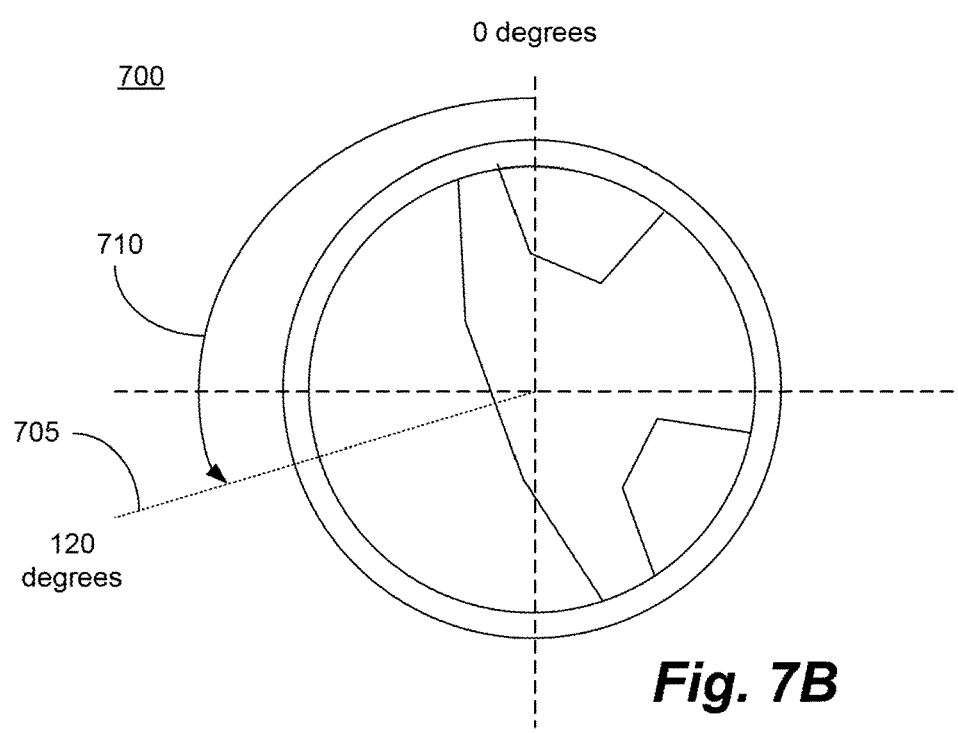
FIG. 7B depicts a steering wheel of the host vehicle in a turned position according to one or more aspects of the disclosed subject matter.

FIG. 7B depicts a steering wheel 700 of the host vehicle 102 in a turned position according to one or more aspects of the disclosed subject matter. Line 705 indicates the position to which the steering wheel 700 was turned (e.g., 120 degrees from the starting point). Arrow 710 indicates the direction that the steering wheel 700 was turned and also indicates that the angle of the steering wheel 700 has been turned beyond a threshold which may indicate that the host vehicle is on a local road, for example. In other words, the steering wheel encoder 140 can detect that the steering wheel 700 has been turned to a position (e.g., a position as indicated by line 705) that is within a range of angles corresponding to an off highway event.

The system 100 includes several advantages including enabling the host vehicle 102 to enable application features based on the road type the host vehicle 102 is traveling on. For example, autonomous vehicle operation may be optimized differently based on the type of road the vehicle is traveling on (e.g., limited access highway vs. local roads). For example, processing power may be recruited more heavily for detecting cars on a limited access highway, whereas more processing power may be recruited to detect pedestrians on local roads.

Additionally, the system 100 can determine road type without the assistance of communicating with infrastructure and without using map and/or GPS information. As a result, the system 100 is hosted entirely within the host vehicle 102 and does not rely on any outside sources of communication. Technical problems may arise when relying on additional infrastructure to determine a road type including limitations of GPS and mapping, for example, where communicating GPS and/or map information may require a wireless network (e.g., not all areas may have robust wireless networks). Additionally, another technical problem of requiring additional infrastructure to determine a road type may include the significant cost to requiring additional infrastructure (e.g., sensors) on every road an autonomous vehicle may be travelling on. It should be appreciated that standard components of road ways (e.g., signs, dividers, etc.) are not considered to be additional infrastructure as they are part of current and standard highway infrastructure. To the contrary, an additional sensor incorporated into the roadway, for example, may be additional infrastructure and is not necessary for operation of the system 100 as the system 100 does not need to communicate with any outside sources to determine road type. As a result, the system 100 provides a technical solution of determining the road type entirely within the host vehicle 102 to various technical problems including relying on GPS and/or mapping, limitations of GPS and/or mapping, and limitations and cost concerns of requiring additional infrastructure to communicate with the autonomous vehicle to determine a road type. For example, GPS and/or map information may be limited when there are new roads not mapped via GPS, when communication of GPS and/or map information requires a wireless connection, and the like. Additionally, the system 100 may provide the technical solution of reallocating processing power to the technical problem of limiting processing power by having additional tasks including receiving GPS and/or map information and/or communicating with additional infrastructure.

1 Further, existing fully autonomous or partially autonomous vehicles may include the necessary hardware and may only need a software upgrade to create a functional system 100.

In an embodiment, the host vehicle 102 can determine that the host vehicle 102 is on a local road by default from the factory (e.g., the first time the host vehicle 102 is turned on).

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A system for determining a road type, comprising:
processing circuitry configured to
  receive information from a plurality of sensors, wherein the information corresponds to one or more of operation of a host vehicle and an environment surrounding the host vehicle,
  determine whether one or more of the plurality of sensors detects an off highway event,
  classify the road type as a local road in response to one or more of the plurality of sensors detecting the off highway event,
  determine whether a speed of the host vehicle is greater than a first predetermined speed for a first predetermined amount of time, and
  classify the road type as a limited access highway in response to the speed of the host vehicle being greater than the first predetermined speed for the first predetermined amount of time.

2. The system of claim 1, wherein the plurality of sensors includes an imaging device, wherein the imaging device is configured to identify targets including a pedestrian, a lateral crossing vehicle, a preceding vehicle, an oncoming vehicle, and a sign.

3. The system of claim 2, wherein identifying one or more of the pedestrian, the lateral crossing vehicle, and one or more predetermined signs corresponds to the off highway event.

4. The system of claim 1, wherein the plurality of sensors includes a wheel speed sensor, wherein the wheel speed sensor is configured to determine the speed of the host vehicle.

5. The system of claim 1, wherein the plurality of sensors includes a steering wheel encoder, wherein the steering wheel encoder is configured to determine an angle of the steering wheel such that the angle of the steering wheel being within a predetermined range of angles corresponds to the off highway event.

6. The system of claim 1, wherein the plurality of sensors includes a predicted path curvature sensor, wherein the predicted path curvature sensor is configured to determine a radius of curvature of the road, wherein the radius of curvature being less than a predetermined radius corresponds to the host vehicle being on the local road.

7. The system of claim 1, wherein the processing circuitry is further configured to determine whether a preceding vehicle is detected and whether the speed of the host vehicle is less than a threshold speed for greater than a second predetermined amount of time.

8. A method for determining a road type, comprising:
receiving information from a plurality of sensors, wherein the information corresponds to one or more of operation of a host vehicle and an environment surrounding the host vehicle;
determining, via processing circuitry, whether one or more of the plurality of sensors detects an off highway event;
classifying, via the processing circuitry, the road type as a local road in response to one or more of the plurality of sensors detecting the off highway event;
determining, via the processing circuitry, whether a speed of the host vehicle is greater than a first predetermined speed for a first predetermined amount of time, and
classifying the road type as a limited access highway in response to the speed of the host vehicle being greater than the first predetermined speed for the first predetermined amount of time.

9. The method of claim 8, wherein the plurality of sensors includes an imaging device, wherein the imaging device is configured to identify targets including a pedestrian, a lateral crossing vehicle, a preceding vehicle, an oncoming vehicle, and a sign.

10. The method of claim 9, further comprising:
identifying one or more of the pedestrian, the lateral crossing vehicle, and one or more predetermined signs as the off highway event.

11. The method of claim 8, further comprising:
determining the speed of the host vehicle via one or more wheel speed sensors.

12. The method of claim 8, further comprising:
determining an angle of a steering wheel of the host vehicle via a steering wheel encoder such that the angle of the steering wheel being within a predetermined range of angles corresponds to the off highway event.

13. The method of claim 8, further comprising:
determining a radius of curvature of the road, wherein the radius of curvature being less than a predetermined radius corresponds to the host vehicle being on the local road.

14. The method of claim 8, further comprising:
determining whether a preceding vehicle is detected and whether the speed of the host vehicle is less than a threshold speed for greater than a second predetermined amount of time.

15. A non-transitory computer-readable storage medium storing computer-readable instructions thereon which, when executed by a computer, cause the computer to perform a method, the method comprising:
  receiving information from a plurality of sensors, wherein the information corresponds to one or more of operation of a host vehicle and an environment surrounding the host vehicle;
  determining whether one or more of the plurality of sensors detects an off highway event;
  classifying the road type as a local road in response to one or more of the plurality of sensors detecting the off highway event;
  determining whether a speed of the host vehicle is greater than a first predetermined speed for a first predetermined amount of time, and
  classifying the road type as a limited access highway in response to the speed of the host vehicle being greater than the first predetermined speed for the first predetermined amount of time.

16. The non-transitory computer-readable storage medium of claim 15, wherein the plurality of sensors includes an imaging device, wherein the imaging device is configured to identify targets including a pedestrian, a lateral crossing vehicle, a preceding vehicle, an oncoming vehicle, and a sign.

17. The non-transitory computer-readable storage medium of claim 16, further comprising:
  identifying one or more of the pedestrian, the lateral crossing vehicle, and one or more predetermined signs as the off highway event.

18. The non-transitory computer-readable storage medium of claim 15, further comprising:
  determining an angle of a steering wheel of the host vehicle via a steering wheel encoder such that the angle of the steering wheel being within a predetermined range of angles corresponds to the off highway event.

19. The non-transitory computer-readable storage medium of claim 15, further comprising:
  determining a radius of curvature of the road, wherein the radius of curvature being less than a predetermined radius corresponds to the host vehicle being on the local road.

20. The non-transitory computer-readable storage medium of claim 15, further comprising:
  determining whether a preceding vehicle is detected and whether the speed of the host vehicle is less than a threshold speed for greater than a second predetermined amount of time.

* * * * *